UNITED STATES PATENT OFFICE.

R. B. FITTS, OF PHILADELPHIA, PENNSYLVANIA.

IMPROVEMENT IN PREPARING NIGHT-SOIL FOR MANURE.

Specification forming part of Letters Patent No. 37,685, dated February 17, 1863.

*To all whom it may concern:*

Be it known that I, R. B. FITTS, of the city of Philadelphia, in the State of Pennsylvania, have invented a new and useful Improvement in the Method or Process of Producing Desiccated Night-Soil for Agricultural Purposes; and I do hereby declare that the following is a full and exact description of the same.

The object of this invention is to diminish both the cost and the time heretofore required to produce the desiccated manure.

It consists, substantially as hereinafter described, in first deodorizing and arresting fermentation in the mass of night-soil in suitable vats, that a separation of the aqueous from the more solid portions may be more expeditiously effected, after which the nitrogenous constituents of the aqueous portion are precipitated and absorbed by suitable chemicals and absorbents, separated from the water and returned to and mixed with the solid portions, and then, finally, the whole rendered pulverulent by sifting and mixing into it sufficient portions of anhydrous sulphate of lime, mixed with charcoal, ashes, or any other appropriate absorbent, until the mass has become sufficiently dried to be put into sacks or barrels for transportation.

To enable others to understand and practice my improved method or process, I will proceed to describe it more fully and exactly.

In the first place the night-soil from the carts is screened into vats, (which are each provided with a suitable means of draining off the water,) then deodorized, the fermentation arrested, and the escape of ammoniacal gas prevented by mixing it with charcoal, sulphate of lime, and a small portion of chloride of sodium or its equivalent and then letting the whole rest undisturbed long enough to allow the solid portions to settle and permit the aqueous portion to be drained off into other vats. The aqueous portions are now (by means of steam-heated pipes or otherwise) brought to such a temperature as may be found the most favorable to the production of decomposition or putrefaction, and immediately after this commences a sufficient quantity of sulphate of magnesia in solution is added, so as to produce a deposition of the salts of ammonia and phosphoric acid; and, finally, the remaining water is filtered off through charcoal to waste and the precipitates, together with the straining charcoal, transferred to the first-mentioned vats and thoroughly mixed with their contents, together with a sufficient quantity of anhydrous sulphate of lime, mixed with charcoal, ashes, or any other suitable absorbent, until a comparatively dry or pulverulent compound is produced. The whole is then removed from the vats and put into sacks or barrels for transportation.

It will be seen that by this method or process all of the most valuable constituents of the night-soil are retained or saved without the expense of erecting apparatus for the purpose of collecting and solidifying or combining the gases with solids, and that the time and labor required to reduce the night-soil from its original semi-fluid condition to a dry or pulverulent one suitable for transportation or storage in sacks or barrels is greatly reduced, and therefore the production of the manufactured article greatly cheapened.

What I claim as new and of my invention, and desire to secure by Letters Patent, is—

The improved method or process described for producing desiccated night-soil for agricultural purposes.

R. B. FITTS.

Witnesses:
BENJ. MORRISON,
WILLIAMS OGLE.